US010100928B2

(12) United States Patent
Cooper

(10) Patent No.: US 10,100,928 B2
(45) Date of Patent: Oct. 16, 2018

(54) FLOATING PISTON

(71) Applicant: SPX Corporation, Charlotte, NC (US)

(72) Inventor: James E. Cooper, Menomonee Falls, WI (US)

(73) Assignee: SPX FLOW, INC., Charlotte, NC (US)

(*) Notice: Subject to any disclaimer, the term of this patent is extended or adjusted under 35 U.S.C. 154(b) by 347 days.

(21) Appl. No.: 14/805,073

(22) Filed: Jul. 21, 2015

(65) Prior Publication Data

US 2016/0025218 A1 Jan. 28, 2016

Related U.S. Application Data

(60) Provisional application No. 62/027,289, filed on Jul. 22, 2014.

(51) Int. Cl.
F16F 9/32 (2006.01)
F15B 15/14 (2006.01)
F16J 1/12 (2006.01)

(52) U.S. Cl.
CPC ............ *F16J 1/12* (2013.01); *F15B 15/1447* (2013.01); *F16F 9/3228* (2013.01)

(58) Field of Classification Search
CPC ... F16J 1/12; F16J 1/24; F15B 15/1447; F16F 9/3228
See application file for complete search history.

(56) References Cited

U.S. PATENT DOCUMENTS

| 470,397 | A | 3/1892 | Jerome |
|---|---|---|---|
| 737,639 | A | 9/1903 | Lewis et al. |
| 986,029 | A | 3/1911 | Steinert |
| 1,434,904 | A | 11/1922 | Mansfield |
| 2,503,659 | A | 4/1950 | Curtis |
| 3,168,853 | A | 2/1965 | Richard |

(Continued)

FOREIGN PATENT DOCUMENTS

| CN | 1062021 | 6/1992 |
|---|---|---|
| DE | 1 151 428 | 7/1963 |

(Continued)

OTHER PUBLICATIONS

European Search Report issued in European Patent Application No. 14782340.5 dated Nov. 4, 2016.

(Continued)

*Primary Examiner* — Logan Kraft
(74) *Attorney, Agent, or Firm* — Baker & Hostetler LLP

(57) ABSTRACT

An actuator is provided. The actuator includes: a housing having an interior elongated hole; a rod dimensioned to fit in the elongated hole; a piston dimensioned to fit in and move along the elongated hole while connected to the rod; mating structure located on at least one of the piston and rod, the mating structure configured to allow the rod to attach to the piston in a manner to create clearance between the rod and the piston to allow the rod and piston to move with respect to each other. A method of attaching a piston to a rod in an actuator may also be provided. The method may include: fitting the piston to the rod; providing a clearance between the piston and the rod; fastening the piston to the rod in a loose manner as to preserve the clearance and allow the piston to move with respect to the rod.

16 Claims, 5 Drawing Sheets

(56) References Cited

U.S. PATENT DOCUMENTS

| | | | |
|---|---|---|---|
| 3,759,146 A * | 9/1973 | Brotherton | F16J 1/12 92/13.6 |
| 4,173,329 A | 11/1979 | Stith, Jr. | |
| 4,457,212 A | 7/1984 | Unger et al. | |
| 4,653,339 A | 3/1987 | Komatsu et al. | |
| 5,509,748 A | 4/1996 | Idosako et al. | |
| 6,152,640 A | 11/2000 | Oda et al. | |
| 6,290,235 B1 | 9/2001 | Albertson | |
| 6,386,088 B1 | 5/2002 | Yoshimoto et al. | |
| 7,040,812 B2 | 5/2006 | Boshier et al. | |
| 7,343,846 B2 | 3/2008 | Stanford et al. | |
| 2005/0013658 A1 | 1/2005 | Muders et al. | |
| 2006/0260462 A1 | 11/2006 | Stanford et al. | |
| 2011/0170943 A1 | 7/2011 | Su | |
| 2013/0199327 A1 | 8/2013 | Park et al. | |
| 2014/0102293 A1 | 4/2014 | Miller et al. | |
| 2014/0308066 A1 | 10/2014 | Cooper | |
| 2015/0184682 A1 | 7/2015 | Cooper et al. | |
| 2015/0233396 A1 | 8/2015 | Cooper et al. | |

FOREIGN PATENT DOCUMENTS

| | | |
|---|---|---|
| DE | 32 45 186 A1 | 6/1984 |
| EP | 1270958 A1 | 1/2003 |
| WO | 2004081377 | 9/2004 |
| WO | 2009/103762 A1 | 8/2009 |
| WO | 2010/142606 A2 | 12/2010 |
| WO | 2014169194 | 10/2014 |
| WO | 2016014667 | 1/2016 |

OTHER PUBLICATIONS

US Office Action dated Dec. 1, 2016, in U.S. Appl. No. 14/338,102.

International Search Report issued in International Patent Application No. PCT/US15/41535 dated Oct. 13, 2015.

"Round Flat Washers & Shims Search" Seastrom Manufacturing Co., Inc. [online] Nov. 2, 2013. Retrieved Sep. 16, 2015. Retrieved from internet: <https://web.archive.org/web/20131102145103/http://seastrom-mfg.com/washersearch.aspx>; p. 1.

United Kingdom Search Report dated Aug. 10, 2016, in Great Britain Patent Application No. GB 1604073.5.

* cited by examiner

FLOATING PISTON

This application claims the benefit of a provisional U.S. patent application entitled Floating Piston, having a Ser. No. 62/027,289, filed Jul. 22, 2014. The disclosure of this application is hereby incorporated by reference in its entirety.

FIELD OF THE INVENTION

The present invention relates generally to piston and rod attachment systems and methods. More particularly, the present invention relates to a system and method of attaching a piston to a rod to reduce stress on the piston and rod resulting from side loads on the rod.

BACKGROUND OF THE INVENTION

An actuator is a mechanism often used to lift or move an object or to clamp an object to prevent motion. An actuator may introduce linear or non-linear motion. Examples of actuators include hydraulic cylinders and/or pneumatic cylinders. Actuators are used in many applications, including construction equipment, engineering vehicles and manufacturing machinery. For example, the hydraulic cylinder is a mechanical actuator that may provide a unidirectional force through a unidirectional stroke. The hydraulic cylinder consists of a cylinder housing in which a piston connected to a rod moves back and forth.

Actuators suffer from disadvantages or drawbacks associated with the misalignment of the rod. This misalignment may result when the longitudinal axis of the rod is not co-located with the longitudinal axis of the bore of the cylinder. This misalignment may be the result of setting poorly balanced or off-center loads on the cylinder. It is not uncommon for a load to be placed on the rod where the forces acting upon the rod are not acting in parallel to the longitudinal axis of the cylinder. These types of forces or loads are sometimes referred to as side loads or side loading. Side loads may occur, for example, when the rod contacts an uneven surface. Side loading may cause damage to the rod, piston, and other components of the cylinder, and cause the cylinder assembly to ultimately fail.

Much effort has been made by manufacturers of hydraulic cylinders to reduce or eliminate the side loading of cylinders. It is almost impossible to achieve perfect alignment of a hydraulic cylinder, even though the alignment of the cylinder has a direct impact on the longevity of the hydraulic cylinder. Actuators for many applications are custom made and expensive so prolonging their life and operation can represent significant savings.

These prior art methods and systems, however, have not sufficiently reduced or eliminated bending moments that cause stress on the rod and ultimately lead to rod failure. Therefore, there is a need for actuators that can operate to reduce bending moments that can potentially cause the cylinder assembly to fail.

The presently disclosed system and method is directed at overcoming one or more of these disadvantages in currently available actuators.

SUMMARY OF THE INVENTION

The foregoing needs are met, to a great extent, by the present invention, where one aspect an apparatus is provided that in some embodiments a rod is fitted to a piston in such a manner as to allow the piston to float or move with respect to the rod. In some embodiments, the float or movement of the piston allows displacement of the rod due to side loads. This results in a reduced stress level on the outer diameter of the piston.

In accordance with an embodiment of the present disclosure, an actuator is provided. The actuator includes: a housing having an interior elongated hole; a rod dimensioned to fit in the elongated hole; a piston dimensioned to fit in and move along the elongated hole while connected to the rod; mating structure located on at least one of the piston and rod, the mating structure configured to allow the rod to attach to the piston in a manner to create clearance between the rod and the piston to allow the rod and piston to move with respect to each other.

In accordance with another embodiment of the present disclosure, a method of attaching a piston to a rod in an actuator may also be provided. The method may include: fitting the piston to the rod; providing a clearance between the piston and the rod; fastening the piston to the rod in a loose manner as to preserve the clearance and allow the piston to move with respect to the rod.

In accordance with yet another embodiment of the present invention, an actuator may be provided. The actuator may include: a housing having an interior elongated hole; a rod dimensioned to fit in the elongated hole; a piston dimensioned to fit in the elongated hole; means for connecting the piston and the rod located on at least one of the piston and rod, the means for connecting is configured to allow the rod to attach to the piston in a manner to create clearance between the rod and the piston to allow the rod and piston to move with respect to each other.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
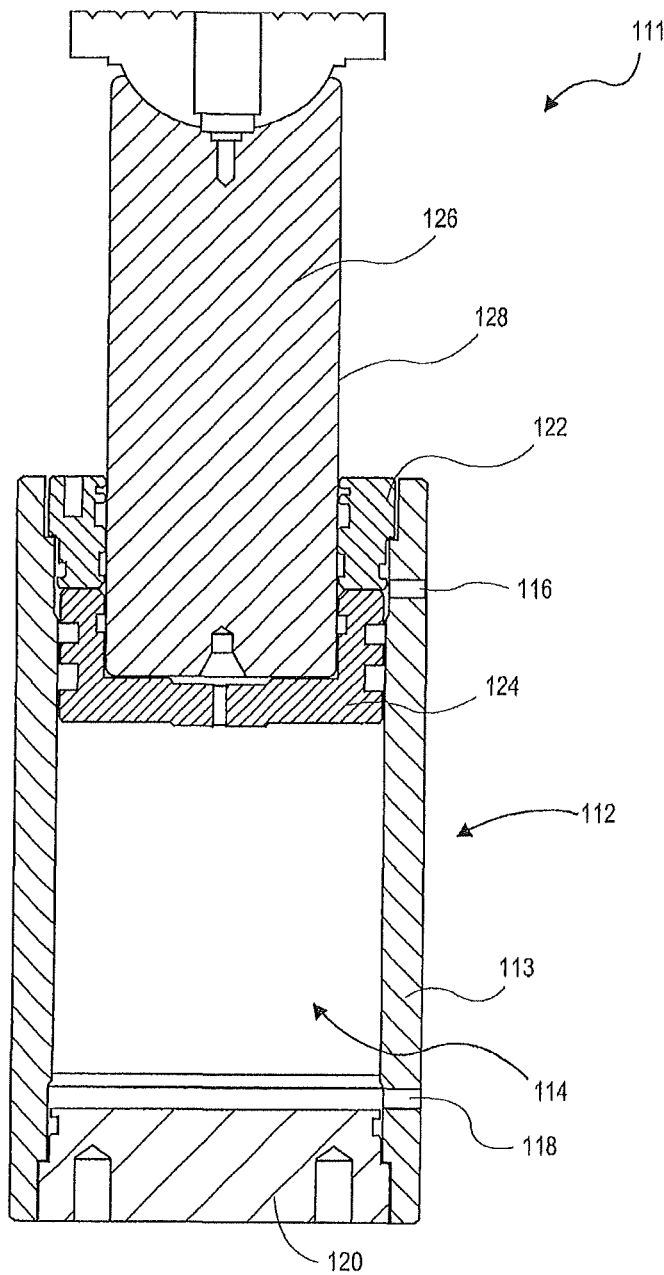
FIG. 1 is a cross-sectional view of a cylinder assembly where the rod is in an extended position in accordance with an embodiment.

Example embodiments in accordance with the present disclosure will now be described with reference to the drawing figures, in which like reference numerals refer to like parts throughout. An embodiment in accordance with the present disclosure is found in the accompanying figures. And actuator may include a piston and cylinder assembly similar to that shown. While the example described herein is a hydraulic cylinder, it will be understood principles of the present disclosure are not limited to hydraulic cylinders but may be used with pneumatic cylinders, gas filled cylinders, or any other type of cylinder or actuator.

Figure 2:
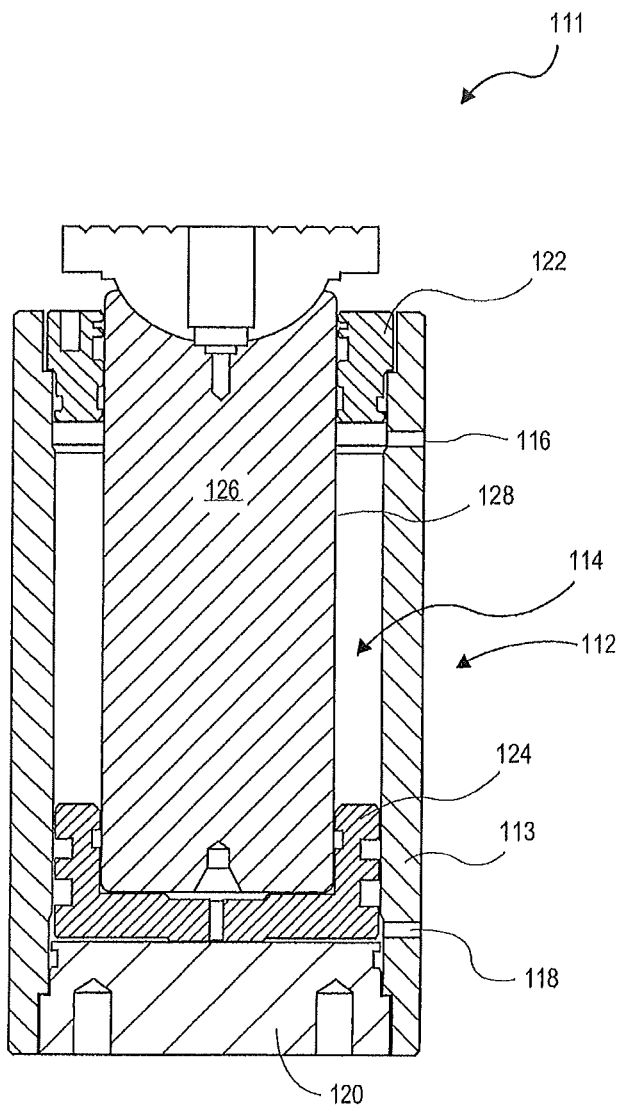
FIG. 2 is a cross-sectional view of a cylinder assembly where the rod is in a retracted position in accordance with an embodiment.

An embodiment of the present inventive apparatus is illustrated in FIGS. 1 and 2. FIGS. 1 and 2 illustrate a cross-sectional view of a hydraulic cylinder assembly 111. The hydraulic cylinder assembly 111 includes a hydraulic cylinder 112 having a housing 113. The hydraulic cylinder housing 113 defines an interior space 114. The hydraulic cylinder 112 contains a plug 120 and a retainer 122 to define a substantially fluid tight interior 114. A first port 116 and a second port 118 provide inlet/outlets for hydraulic fluid to enter or leave the interior 114 of the hydraulic cylinder 112.

When hydraulic fluid enters the second port 118 and exits the first port 116, the piston 124 is pushed upward as shown in FIG. 1. This causes the rod or shaft 126 to move out of the hydraulic cylinder 112. When hydraulic fluid enters the first port 116 and exits the second port 118, the piston is pushed inward as shown in FIG. 2. This causes the rod or shaft 126 to move into the hydraulic cylinder 112.

As the rod or shaft 126 moves in and out of the hydraulic cylinder 112, the rod 126 slides against the retainer 122. Often, the rod 126 is subjected to side loads or, in other words, loads that are not in line with the longitudinal axis of the cylinder 112. Side loads cause the rod 126 to urge against the retainer 122. Wear of the surface 128 of the rod 126 against the retainer 122 can cause damage to the surface 128 of the rod 126 and/or retainer 122.

Figure 3:
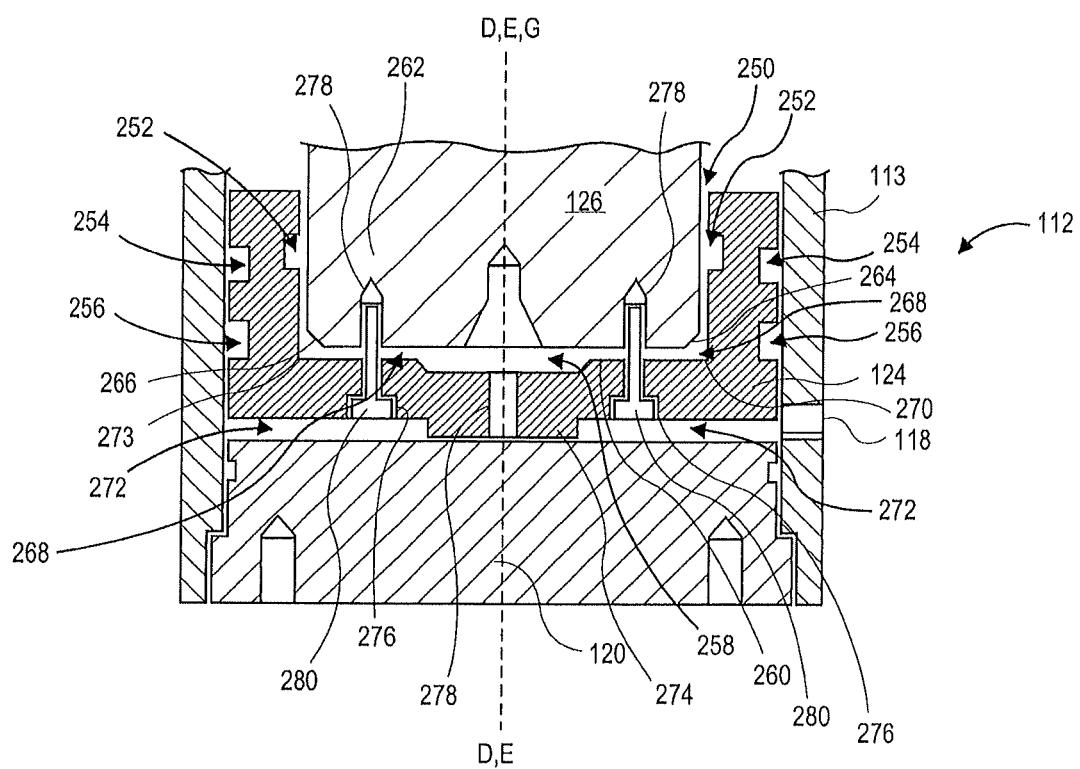
FIG. 3 is a partial cross-sectional view of a cylinder assembly showing additional detail.

FIG. 3 is an enlarged detailed partial cross-sectional view similar to that shown in FIG. 2. The rod 126 is seated in a socket portion 250 of the piston 124. The piston 124 may include various voids 252, 254, and 256. These voids 252, 254, and 256 may be used for various inserts such as piston seals or any other inserts. In other embodiments they may be left as voids or not be present. In still other embodiments, there may be more or fewer voids 252, 254 and 256 than as shown.

The piston 124 when seated against the plug 120 may also form a gap or clearance 272 between the piston 124 and the plug 120. This gap or clearance 272 may be a result of the projection 274 on the piston 124. The projection 274 prevents the piston 124 from moving completely against the plug 120. As a result, hydraulic fluid coming into the port 118 can fill into the gap 272 and exert force upwardly (as shown in FIG. 3) to move the piston 124 in an upward direction. If there were no gap 272, it would be difficult for fluid to urge against the piston 124 to lift the piston 124. In some embodiments, the projection 274 may cover about 10% of the surface area of the piston 124. In other embodiments the projection 274 may have different dimensions. After reviewing this disclosure, one of ordinary skill in the art will understand that the projection 274 could also be located on the plug 120 and achieve a similar result.

The socket portion 250 of the piston 124 may contain a seat void 258. The rod seat 260 may form the bottom of the socket portion 250. The piston end 262 of the rod 126 is fit with in the socket portion 250. The piston end 262 of the rod 126 may be chamfered as shown at sides 264 and 266 in FIGS. 3 and 5. When the piston end 262 of the rod 126 is fit with in the socket portion 250 of the piston 124, there is a clearance or void 268 between the seat 260 in the socket portion 250 of the piston 124 and the end 262 of the rod 126. The clearance void 268 extends to both seat corners 270 and 273. The clearance void 268 may be a result of loosely attaching the piston 124 to the rod 126.

As shown in FIG. 3, the piston 124 is attached to the rod 126 with fasteners 280 fit into fastener holes 276 in the piston 124 and fastener holes 278 located in the rod 126. In some embodiments, only the fasteners 280 and the fastener holes 278 in the rod 126 are threaded. The fasteners 280 are adjusted so that the gap 268 is at a desired amount. In some embodiments, the gap 268 may be about 0.015 inches. In other embodiments larger or smaller gaps may be used. In some embodiments, when attaching the piston 124 to the rod 126, the fasteners 280 are turned so that the piston 124 just contacts the rod 126 and then the fasteners 280 are backed out about a half turn to create a desired gap 268.

Figure 4:
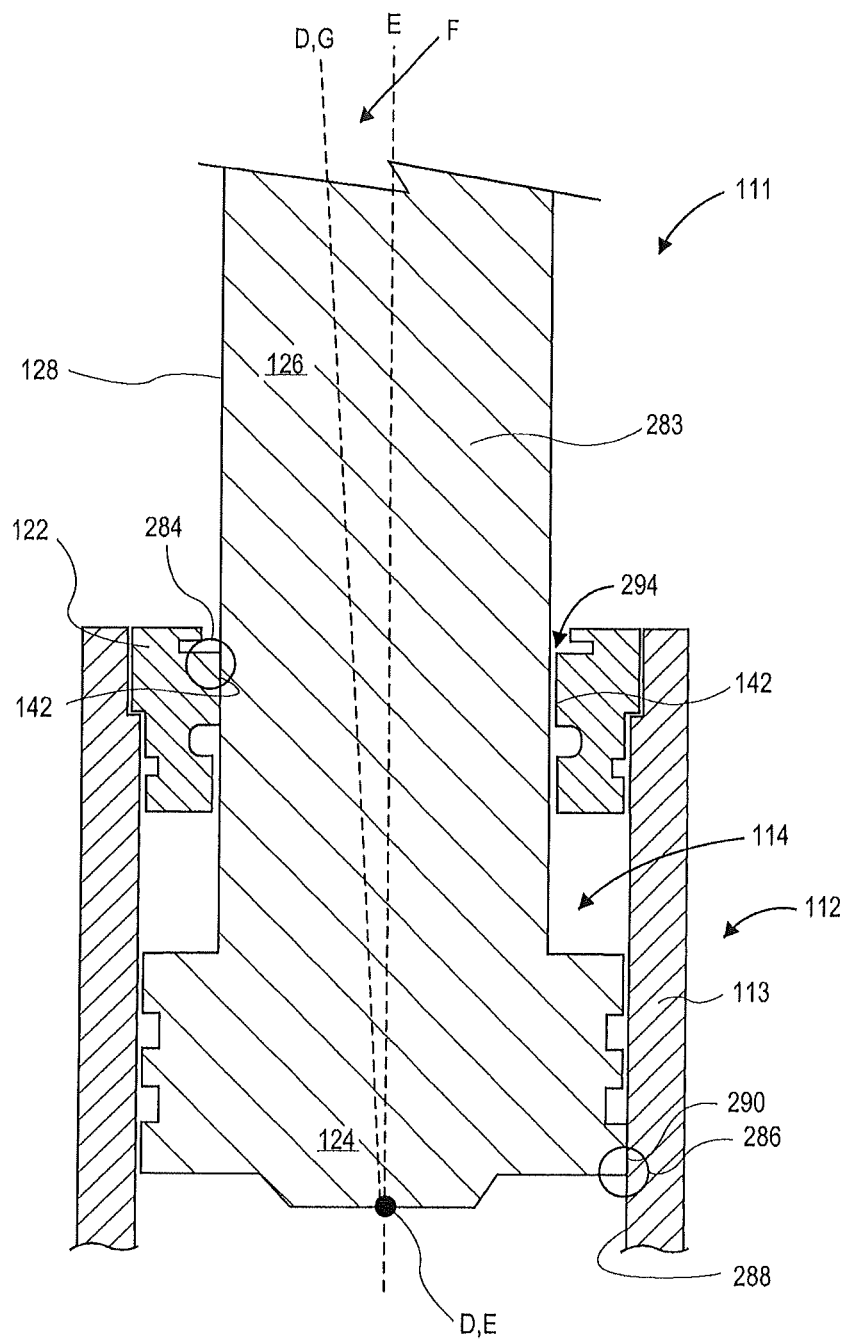
FIG. 4 is a partial cross-sectional view of a cylinder assembly.
Figure 5:
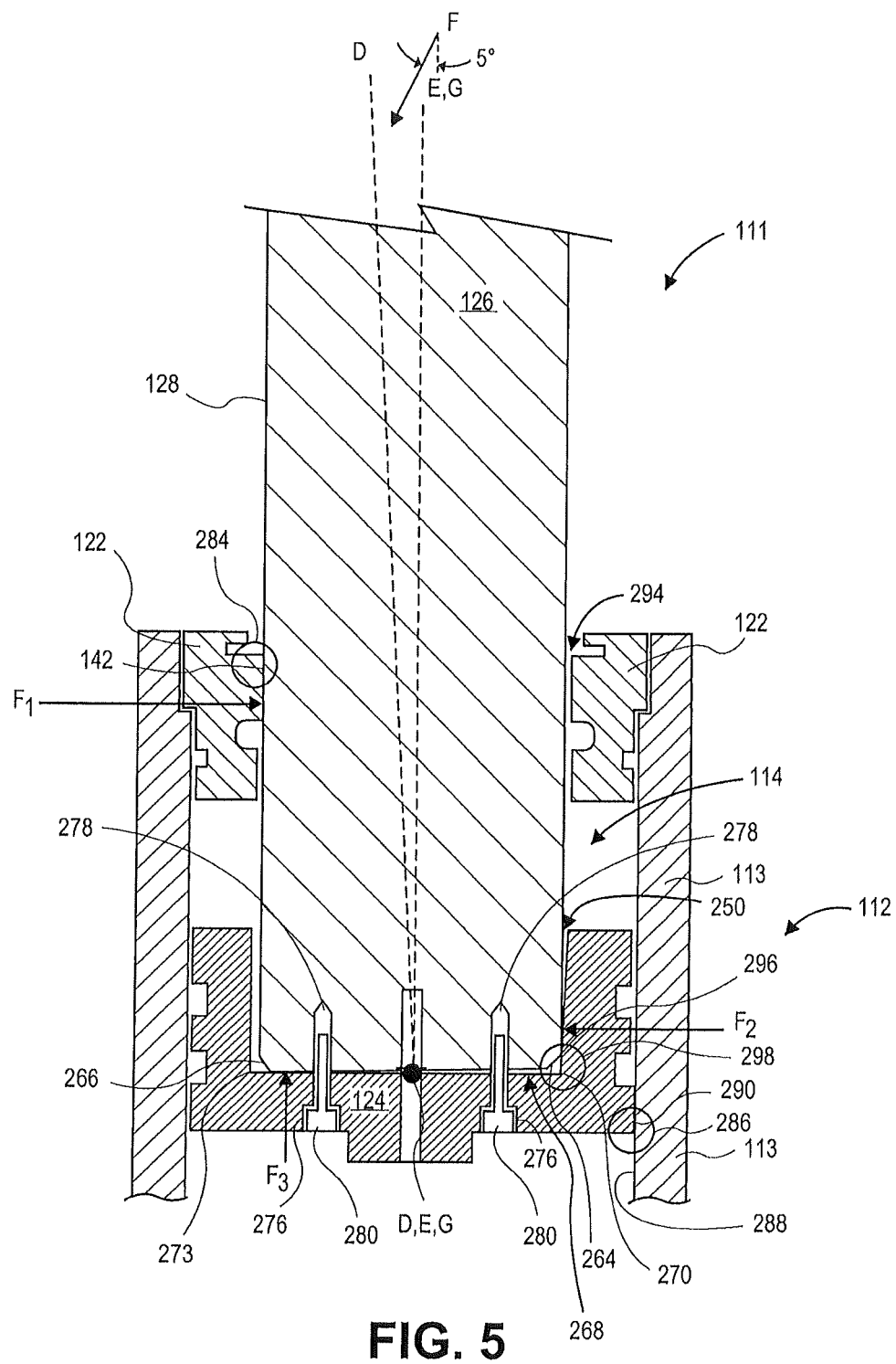
FIG. 5 is a partial cross-sectional view of a cylinder assembly.

FIG. 4 shows a piston assembly 111 not in accordance with the present disclosure. The piston assembly 111 shown in FIG. 4 represents a piston 124 and rod 126 that are unified together. The piston 124 and rod 126 may be unified because they are made of a single unitary part or they are unified because the piston 124 is attached to the rod 126 in a snug manner so that no gap 268 (as shown in FIGS. 3 and 5) exists.

The rod 126 will encounter a side load or, in other words a load that is not completely parallel with the axis E of the cylinder 112, causing the rod 126 and the piston 124 to be displaced. In FIG. 4, the side load force is represented by arrow F. The angle of arrow F is exaggerated to better illustrate the side load. The force of arrow F, causes the rod 126 to be displaced so that the axis D the of the rod 126 and the axis G of the piston 124 are not parallel to the axis E of the interior 114 of the cylinder. Because the rod 126 and piston 124 are unified, it is assumed for the sake of this discussion that the axis D of the Rod 126 and the axis G of the piston 124 are coaxial. Theoretically, if there were no side load force F and the hydraulic piston assembly 111 was manufactured to perfect dimensions, the axis D of the rod 126 the axis G of the piston 124 and the axis E of the interior 114 of the cylinder would be perfectly aligned. However this is never the case so a misalignment of the three axes D, G, and E is the rule rather than the exception.

Displacement of the rod 126 as a result of force F causes the surface 128 of the rod 126 to bear against the bearing surface 142 of the retainer 122. The bearing of the surface 128 of the rod 126 against the bearing surface 142 in the retainer 122 results in a retainer high stress area 284. As the rod 126 moves in or out and bears against the retainer 122, the surface 128 of the rod 126 may become scored, worn, or damaged as well as the surface 142 of the retainer 122.

On the opposite side of the rod 126 there is a gap 294 between the rod 126 and the bearing surface 142 of the retainer 122. In addition the piston 124 may also have a high stress area 286. In the piston high stress area 286, the wall 288 of the cylinder housing rubs against the bearing surface 290 on the piston 124. This may result in wear and scoring on either or both of the piston 124 and the wall 288 of the cylinder housing. Not only does this condition create undesirable wear, it can also reduce the efficiency and effectiveness of the cylinder assembly 111 due to energy being wasted in overcoming friction to move the piston 124 or rod 126 in the high stress areas 284, 286.

FIG. 5 is a partial enlarged cross-sectional view of a cylinder assembly 111 in accordance with the present disclosure. The rod 126 is loosely connected to the piston 124. This loose connection may sometimes be referred to as a floating piston 124. Arrow F represents a force acting in a direction not parallel to the cylinder axis E. The rod 126 is displaced by the side load of force F so that the exterior surface 128 of the rod 126 is pressed against the bearing surface 142 of the retainer 122 at the high stress area 284. On the opposite side of the rod 126 a gap 294 exists between the rod 126 and the retainer 122.

The piston 124 is squarely within the interior 114 of the cylinder 112 in contrast to what was shown in FIG. 4. As a result, the axis G of the piston is substantially parallel with the axis E of the cylinder 112. This is different than what was shown in FIG. 4. In FIG. 4 the rod axis D and the piston axis G were substantially coaxial. However in the embodiment shown in FIG. 5, the piston axis G is substantially parallel with the bore axis E. Making the piston axis G substantially parallel with the bore axis D allows the piston 124 to move in the interior 114 of the cylinder 112 without creating undue stress, wear, or have increased friction to move the piston 124 along the side wall 288.

As shown in FIG. 5, the piston 124 is squarely located within the interior 114 of the cylinder 112, and there is no undue binding in the area 286 between the bearing surface 290 on the piston 124 and the wall 288 of the cylinder 113. Instead, the rod 126 urges against an interior of the socket portion 250 of the piston 124. The side 264 of the rod 126 is pressed against the sidewall 296 of the socket portion 250 at stress area 298 as a result of force F. However the urging of the side 264 of the rod 126 against the sidewall 296 of the piston 124 does not create unnecessary wear binding because there is relatively little movement of the rod 126 with respect the piston 124 compared to the movement of the piston 124 against the sidewall 288 of the cylinder housing 113 such as that shown in FIG. 4. As a result, the wear on the sidewall 288 of the cylinder housing 113 is much reduced in FIG. 5 compared to the embodiment shown in FIG. 4. Furthermore, it requires less force or energy to move the piston 124 and rod 126 in and out through the interior 114 of the cylinder 112 then in the embodiment shown in FIG. 4.

The rod 126 still may have a clearance void 268 but the shape of that void 268 may be different or change depending upon the direction and amount of force F. One of ordinary skill the art would understand that the orientation of the rod 126 would change if the direction and/or amount of the force F also changed.

The chamfer at either side 266 and 264 or anywhere else around the circumference of the rod 126 may, in some embodiments, provide relief to allow the rod 126 to slightly pivot or otherwise move in the socket portion 250 of the piston 124. In some embodiments, a point identified in FIG. 5 is point D, E, G may exist where the rod axis D, the cylinder axis E, and the piston axis G intersect. In some embodiments this may be a point about which the rod 126 pivots as a result of force F.

One of ordinary skill in the art may understand after reviewing this disclosure that if force F is significant enough the rod 126 will pivot or move within the piston 124 and also cause the piston 124 to pivot or move within the interior 114 of the cylinder housing 113.

In some embodiments, the fasteners 280 may only be threadably attached to the rod 126 in the fastener holes 278 and not threadably attached to the faster holes 276 in the piston 124 to better facilitate pivoting movement of the rod 126 with respect to the piston 124.

Forces F1, F2, and F3 illustrated in FIG. 5 are reactionary forces resulting from the force F placed on the rod 126. As discussed above, when force F is applied to the rod 126, the rod 126 will pivot about point D,E,G. This movement will cause the rod 126 to contact the retainer 122 at stress area 284. Furthermore, the bottom of the rod 126 may slide to the right as shown in FIG. 5 toward corner 270. The rod 126 will also contact the piston 124 at stress area 298. This contact will result in reactionary forces acting upon the rod 126. For example force F1 is a reactionary force that the retainer 122 will impart upon the rod 126. Force F2 is a reactionary force the piston 124 will impart upon the side of the rod 126. Force F3 represents a force that the piston 124 will impart to the rod 126. One of ordinary skill in the art will understand that the reactionary forces as illustrated as F1, F2, and F3 are mere representations of forces which are distributed along an area and not only at discrete points as shown. The reactionary forces F1, F2, and F3 will create a bending moment to counteract the force F imparted to the rod 126. One advantage of the floating piston design is that due to the relative movement between the piston 124 and the rod 126 reactionary force F3 is created in reaction to force F. The presence of F3 results in the magnitude of F1 and F2 being smaller to react to force F than if F3 was not present.

In particular, reactionary force F3 will create a bending moment which will result in a lower stress in stress areas 284, 286, and 296 between the rod 126 and the retainer 122, the rod 126 and the piston 124, and the piston 124 and the housing 113, then would be found in an embodiment shown in FIG. 4 operating under a similar side load F. As a result, the embodiment shown in FIG. 5 provides certain advantages compared to the embodiment of FIG. 4.

In addition to reducing stress, the embodiment of FIG. 5 also reduces wear between the piston 124 and the housing 113. The wear is reduced because the high stress contact area is static between the rod 126 and the piston 124 which is in contrast, to the embodiment of FIG. 4 where the high stress area is dynamic between the piston 124 and the housing 113 of the cylinder 112. In the embodiment of FIG. 5, at the dynamic surface between the piston 124 and the housing 113 of the cylinder 112 the stress is reduced due to the piston 124 being able to better align within the cylinder 112 even when the rod 126 is out of alignment due to a side load F.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An actuator comprising:
    a housing having an interior elongated hole;
    a rod dimensioned to fit in the elongated hole, the rod having a piston end, the piston end being chamfered;

a piston dimensioned to fit in and move along the elongated hole while connected to the rod, the piston having a socket portion configured to receive the piston end; and a mating structure located on at least one of the piston and rod, the mating structure configured to allow the rod to attach to the piston in a manner to create a clearance in the socket portion between the piston end of the rod and the piston to allow the rod and piston to move with respect to each other, the clearance including a bottom portion between the piston end and a bottom portion of the socket portion and the clearance including an annular portion defined by a gap between an inside surface of the socket portion and an outside surface of the rod extending into the socket portion, the clearance is 0.015 of an inch, wherein the piston end being chamfered is configured to allow the piston end to pivot within the socket portion.

2. The actuator of claim 1, wherein the mating structure includes a hole in the piston, a hole in the rod, and a fastener located in the hole in the piston and the hole in the rod.

3. The actuator of claim 1, wherein the fastener is a bolt or screw and the fastener is tightened at least a half a turn away from being tightened to the point where the rod is butted up tight against the piston.

4. The actuator of claim 1, wherein the mating structure includes a depression in the piston dimensioned to allow the rod to fit in the depression.

5. The actuator of claim 1, where in the piston further comprises a projection located on a side of the piston opposite where the rod attaches to the piston.

6. The actuator of claim 5, wherein the projection covers 10% of a surface area of the side of the piston opposite where the rod attaches to the piston.

7. The actuator of claim 1, wherein an outer circumference of the end of the rod that engages the piston is chamfered.

8. The actuator of claim 1, wherein the actuator is configured to handle side loads up to 5° from the axis of the elongated hole in the cylinder.

9. A method of attaching a piston to a rod in an actuator comprising:

fitting the piston to the rod, the rod having a piston end, the piston end being chamfered, the piston having a socket portion configured to receive the piston end;

providing a clearance in the socket portion between the piston and the piston end of the rod, the clearance including a bottom portion between the piston end and a bottom portion of the socket portion and the clearance including an annular portion defined by a gap between an inside surface of the socket portion and an outside surface of the rod extending into the socket portion, the clearance is 0.015 of an inch, wherein the piston end being chamfered is configured to allow the piston end to pivot within the socket portion; and fastening the piston to the rod in a loose manner as to preserve the clearance and allow the piston to move with respect to the rod.

10. The method of claim 9, further comprising attaching the piston to the rod with the fastener.

11. The method of claim 10, further comprising tightening the fastener so the piston is snug against the rod and then loosening the fastener about a half a turn.

12. The method of claim 10, further comprising chamfering the outer circumferential edge of the rod.

13. The method of claim 9, further comprising dimensioning the piston and the rod so that the rod can rotate in space with respect the piston.

14. The method of claim 9, further comprising placing a projection on a side of the piston opposite a side of the piston that engages the rod.

15. The method of claim 14, wherein the projection covers 10% of a surface of the side of the piston opposite the side of the piston that engages the rod.

16. The method of claim 9, further comprising at least one of either: placing the rod into an indentation in the piston and placing the piston in an indentation in the rod.

* * * * *